(12) United States Patent
Naniwae (10) Patent No.: US 6,681,064 B2
(45) Date of Patent: Jan. 20, 2004

(54) MULTI-WAVELENGTH SEMICONDUCTOR LIGHT SOURCE AND PROCESS FOR PRODUCING THE SAME

(75) Inventor: Koichi Naniwae, Minato-ku (JP)

(73) Assignee: NEC Corporation, Tokyo (JP)

( * ) Notice: Subject to any disclaimer, the term of this patent is extended or adjusted under 35 U.S.C. 154(b) by 76 days.

(21) Appl. No.: 10/131,224

(22) Filed: Apr. 25, 2002

(65) Prior Publication Data

US 2002/0159705 A1 Oct. 31, 2002

(30) Foreign Application Priority Data

Apr. 25, 2001 (JP) ........................................ 2001-127481

(51) Int. Cl.⁷ ................................................ G02B 6/28
(52) U.S. Cl. ............................ 385/24; 385/14; 385/49; 385/89; 372/50
(58) Field of Search .............................. 385/24, 49, 14, 385/15, 89; 372/50, 46

(56) References Cited

FOREIGN PATENT DOCUMENTS

| JP | 9-127424 A | 5/1997 |
|---|---|---|
| JP | 9-127424 | * 5/1997 |
| JP | 9-512353 A | 12/1997 |

OTHER PUBLICATIONS

S. Nakamura et al., "High–Brightness InGaN Blue, Green and Yellow Light–Emitting Diodes with Quantum Well Structures", Jpn. J. Appl. Phys., vol. 34, No. 7A, Part 2 (Jul. 1, 1995), pp. L797–L799.

* cited by examiner

Primary Examiner—Phan T. H. Palmer
(74) Attorney, Agent, or Firm—Sughrue Mion, PLLC (57) ABSTRACT

All of a plurality of visible semiconductor light emitting devices, optical waveguides coupled to these visible semiconductor light emitting devices, and a mutiplexer for multiplexing lights from the optical waveguides to prepare multi-wavelength or white light are integrally provided on a single substrate. By virtue of the above construction, a multi-wavelength semiconductor light source can be realized which can reduce the trouble of regulating the optical axis of the optical waveguides and the multiplexer and can contribute to a reduction in cost and a reduction in size.

15 Claims, 9 Drawing Sheets

MULTI-WAVELENGTH SEMICONDUCTOR LIGHT SOURCE AND PROCESS FOR PRODUCING THE SAME

FIELD OF THE INVENTION

The invention relates to a multi-wavelength semiconductor light source and a process for producing the same, and particularly to a semiconductor integrated device for providing multi-wavelength light or white light using a plurality of semiconductor light emitting devices.

BACKGROUND OF THE INVENTION

Methods have hitherto been proposed wherein lights from semiconductor light emitting devices, which respectively emit lights different from each other or one another in wavelength, are combined together through an optical fiber or an optical lens to provide a white light source or a multi-wavelength light source. For example, Japanese Patent Laid-Open No. 127424/1997 discloses a light source wherein a plurality of lights different from each other or one another in wavelength are combined using optical fibers and a multiplexer and the combined light is then made incident on a single optical fiber to provide white light.

Figure 1:
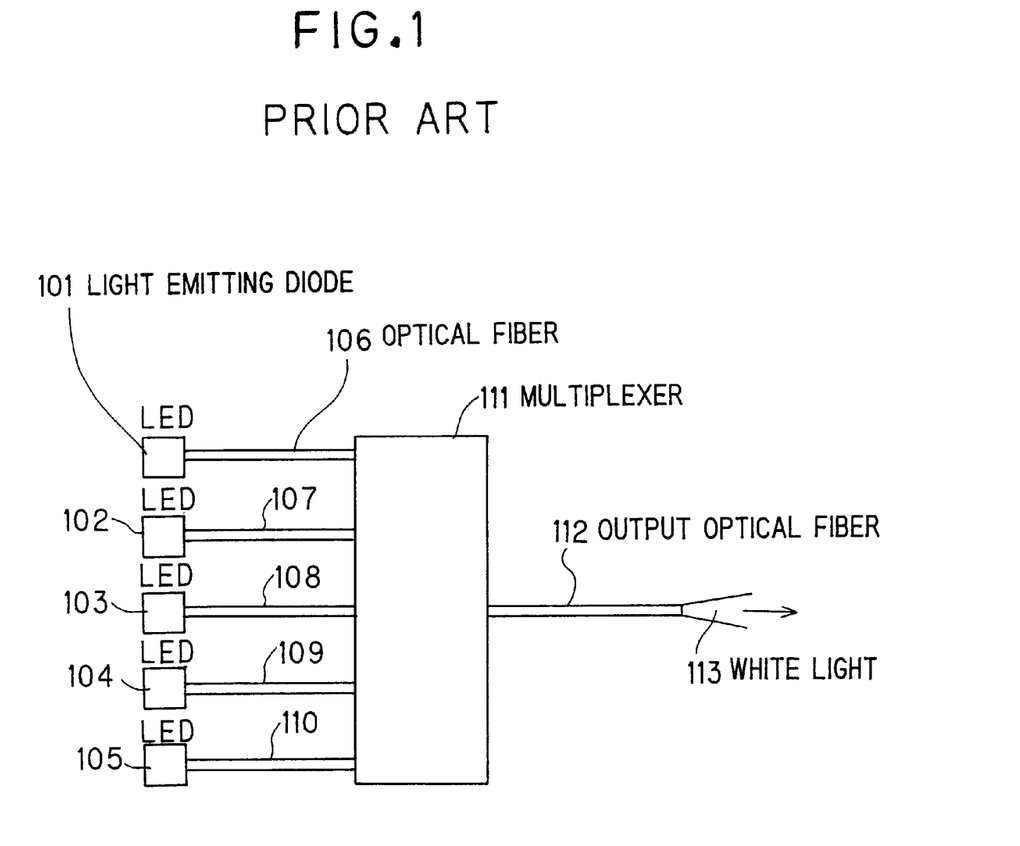
FIG. 1 is a plan view showing the construction of a conventional white light source.

FIG. 1 shows the construction of a conventional multi-wavelength semiconductor light source. This construction is disclosed in Japanese Patent Laid-Open No. 127424/1997. According to this construction, optical fibers 106 to 110 are connected respectively to LEDs (light emitting diodes) 101 to 105 which respectively emit lights different from one another in color (for example, LED 101 emits red light, LED 102 orange light, LED 103 yellow light, LED 104 green light, and LED 101 blue light). A multiplexer 111 is connected to respective ends of the optical fibers 106 to 110. An output optical fiber 112 is connected to the outgoing end of the multiplexer 111 and allows white light to exist therefrom.

In the construction shown in FIG. 1, the color lights emitted from LEDs 101 to 105 are passed through the optical fibers 106 to 110 and are gathered in the multiplexer 111, followed by multiplexing in the multiplexer 111. The multiplexing (color mixing) in the multiplexer 111 provides white light. This white light is passed through the output optical fiber 112 and is taken out of the output optical fiber 112.

Publication No. 512353/1997 of the Japanese Translation of International Patent Application proposes a color image formation system wherein lights from a plurality of light sources (semiconductor light emitting devices for three color lights, red light, green light, and blue light) are led to a deflection unit through an optical fiber to spacially combine the lights, and the combined light is further deflected by a deflecting mirror to form a two-dimensional or three-dimensional color image on a projection surface.

According to the conventional multi-wavelength semiconductor light sources, however, in the construction wherein a white light source or a multi-wavelength light source is used and light output from the light source is led to a multiplexer or a deflection unit through optical fibers, a large number of steps or a lot of time is necessary for coupling and matching between the plurality of semiconductor light emitting devices and the optical fibers or the waveguide. This leads to an increase in cost and, in addition, an increase In size of the system.

SUMMARY OF THE INVENTION

Accordingly, it is an object of the invention to provide a small-size and inexpensive multi-wavelength semiconductor light source that utilizes a plurality of semiconductor light emitting devices, which respectively emit lights different from each other or one another in wavelength, and can realize the formation of multi-wavelength light or white light, and a process for producing the same.

According to the first feature of the invention, a multi-wavelength semiconductor light source comprises: a substrate; a plurality of semiconductor light emitting devices provided on the substrate, for emitting respective lights different from each other or one another in wavelength; a plurality of optical waveguides provided on the substrate so that the optical waveguides in their one end are coupled respectively to the plurality of the semiconductor light emitting devices; and a multiplexer provided on the substrate so as to be coupled respectively to the other ends of the plurality of optical waveguides, for multiplexing lights output from the plurality of optical waveguides and outputting the multiplexed light.

According to this construction, all of a plurality of semiconductor light emitting devices, a plurality of optical waveguides coupled thereto, and a multiplexer coupled to the optical waveguides are integrally provided on an identical substrate to constitute a single device. This can eliminate the necessity of preparing separate components, components assembly step, and steps and works for matching or the like and thus can realize a reduction in size and a reduction in cost.

According to the second feature of the invention, a process for producing a multi-wavelength semiconductor light source comprises the steps of: forming a plurality of semiconductor light emitting devices, which each comprise a light emitting layer and a pair of cladding layers sandwiching the light emitting layer therebetween and emit respective lights different from each other or one another in wavelength, on a substrate by a method including etching or selective formation; and forming, on the substrate by a method including etching or selective formation, a plurality of optical waveguides, which each comprise a core layer and a pair of cladding layers sandwiching the core layer therebetween, the plurality of the optical waveguides in their one end being coupled respectively to the plurality of semiconductor light emitting devices, and a multiplexer coupled to the other ends of the plurality of optical waveguides.

According to this process, after the formation of a plurality of semiconductor light emitting devices on a substrate, a plurality of optical waveguides coupled to the semiconductor light emitting devices and a multiplexer coupled to the optical waveguides are formed onto the substrate. Accordingly, the plurality of semiconductor light emitting devices and the plurality of optical waveguides can be simultaneously provided on a single substrate. This can eliminate the necessity of preparing separate components, components assembly step, and steps and works for matching or the like and thus can realize a reduction in size and a reduction in cost.

According to the third feature of the invention, a process for producing a multi-wavelength semiconductor light source, comprising the steps of: forming a plurality of semiconductor light emitting devices, which each comprise a light emitting layer and a pair of cladding layers sandwiching the light emitting layer therebetween and emit respective lights different from each other or one another in wavelength, on a substrate by a method including etching or selective formation; and previously preparing a plurality of optical waveguides, which each comprise a core layer and a pair of cladding layers sandwiching the core layer therebetween, the plurality of the optical waveguides in their one end being to be coupled respectively to the plurality of semiconductor light emitting devices, and a multiplexer to be coupled to the other ends of the plurality of optical waveguides, and, after the formation of the plurality of semiconductor light emitting devices, mounting the plurality of optical waveguides and the multiplexer onto the substrate.

According to this process, after the formation of a plurality of semiconductor light emitting devices on a substrate, a plurality of optical waveguides coupled to the semiconductor light emitting devices and a multiplexer coupled to the optical waveguides are mounted onto the substrate. Accordingly, the plurality of semiconductor light emitting devices and the plurality of optical waveguides are simultaneously provided on a single substrate. This can eliminate the necessity of preparing separate components, components assembly step, and steps and works for matching or the like and thus can realize a reduction in size and a reduction in cost.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

[First Preferred Embodiment]

Figure 2:
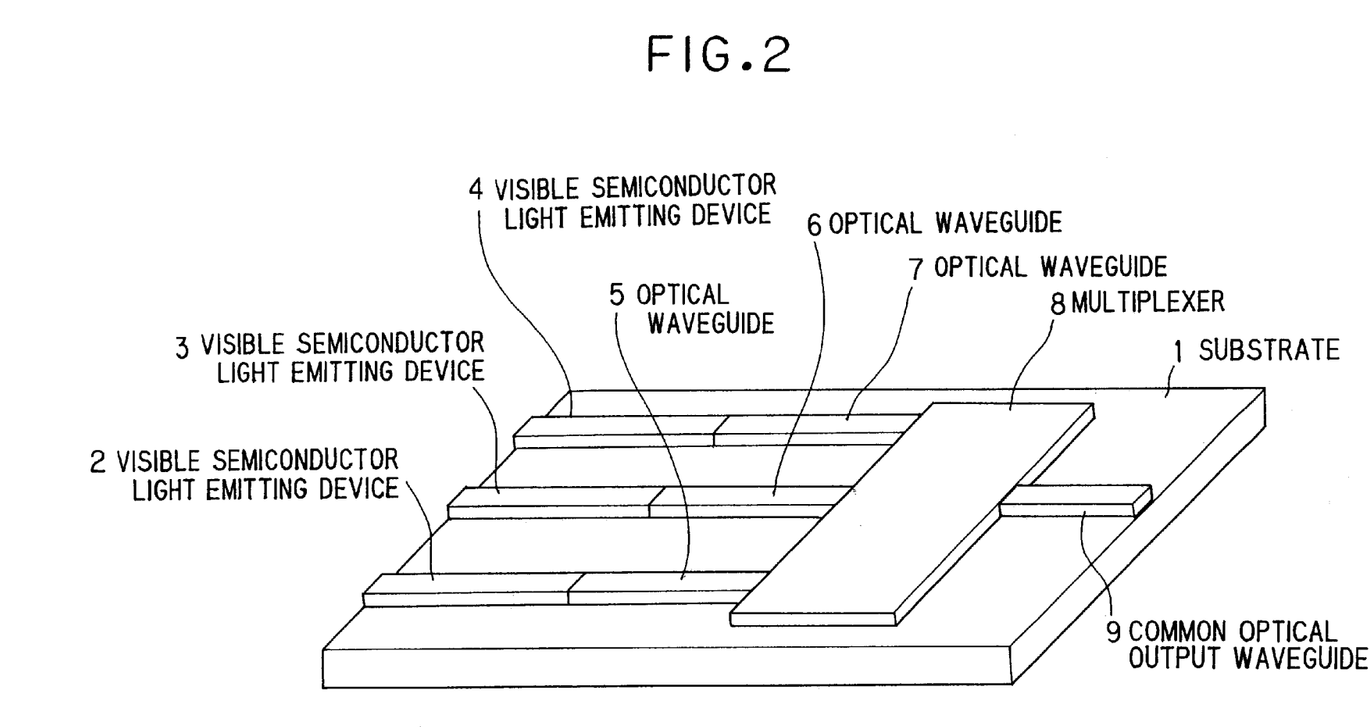
FIG. 2 is a perspective view showing the construction of a first preferred embodiment of the multi-wavelength semiconductor light source according to the invention.

FIG. 2 shows the first preferred embodiment of the multi-wavelength semiconductor light source according to the invention.

As shown in FIG. 2, first, second, and third visible semiconductor light emitting devices 2, 3, 4 are provided, on the surface of a substrate 1, parallel to one another at predetermined intervals. Lights L1, L2, L3 output from the visible semiconductor light emitting devices 2 to 4 respectively have peak wavelengths $\lambda 1$, $\lambda 2$, $\lambda 3$, full widths at half maximum $\Delta\lambda 1$, $\Delta\lambda 2$, $\Delta\lambda 3$, peak light intensities I1, I2, I3, and integrated light intensities S1, S2, S3. Optical waveguides 5, 6, 7 provided on the surface of the substrate 1 are coupled respectively to the visible semiconductor light emitting devices 2 to 4, and a multiplexer 8 is connected to the ends of the optical waveguides 5 to 7. The multiplexer 8 is constructed of an arrayed waveguide diffraction grating (AWG), a matrix optical switch or the like. This multiplexer 8 functions to multiplex the output lights L1 to L3, and the multiplexed light exits as a common output light COL1 from a common optical output waveguide 9 connected to the multiplexer 8. Here the term "visible light" refers to a visible electromagnetic radiation particularly with discontinuous wavelength or wavelength region in a wavelength region of 400 to 760 nm.

This common output light COL1 is perceived by the human's eye as light having a color determined based on the principle of additive color mixing. The color and intensity of the common output light COL1 can be varied, for example, by varying any one of the peak wavelengths $\lambda 1$ to $\lambda 3$, full widths at half maximum $\alpha\lambda 1$ to $\Delta\lambda 3$, the peak light intensities I1 to I3, and the integrated light intensities S1 to S3 of the lights L1 to L3 output from the visible semiconductor light emitting devices 2 to 4.

When a modulation function is imparted to the multiplexer 8, the light COL1 output from the common output waveguide can also be regulated by modulating any one of the light intensities I, the integrated light intensity S, the pulse cycle, and the pulse width of the output lights L1 to L3. Further, alternatively, a method may be adopted wherein a semiconductor optical amplifier (SOA), an electro-absorption (EA) optical modulator, an optical switch or the like is inserted in any portion on the waveguides 5 to 7, the multiplexer 8, or the common output waveguide 9 and any one of the light intensities I, the integrated light intensity S, the pulse cycle, and the pulse width of the output lights L1 to L3 guided to the multiplexer 8 is modulated to vary the color and intensity of the light COL1 output from the common optical output waveguide 9.

Figure 3A:
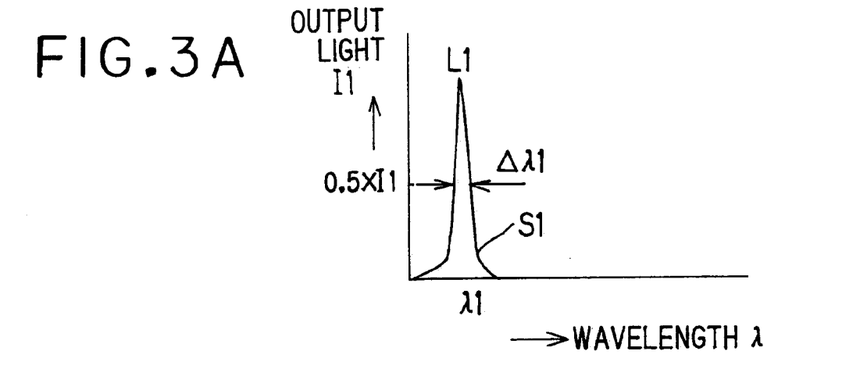
FIGS. 3A to 3C are characteristic curves showing an optical output spectrum for a visible semiconductor light emitting device in the first preferred embodiment of the invention.
Figure 3B:
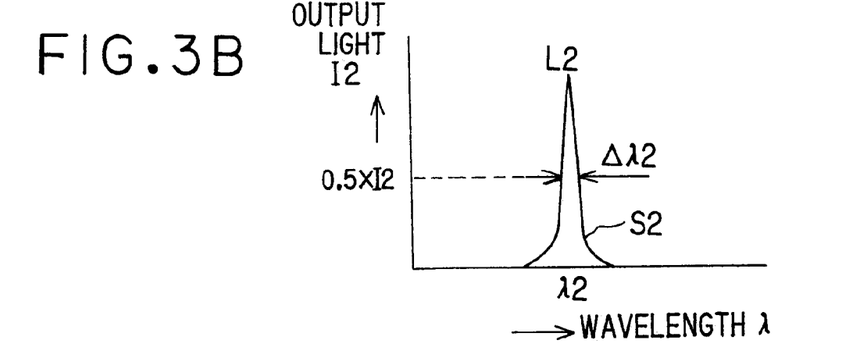
Figure 3C:
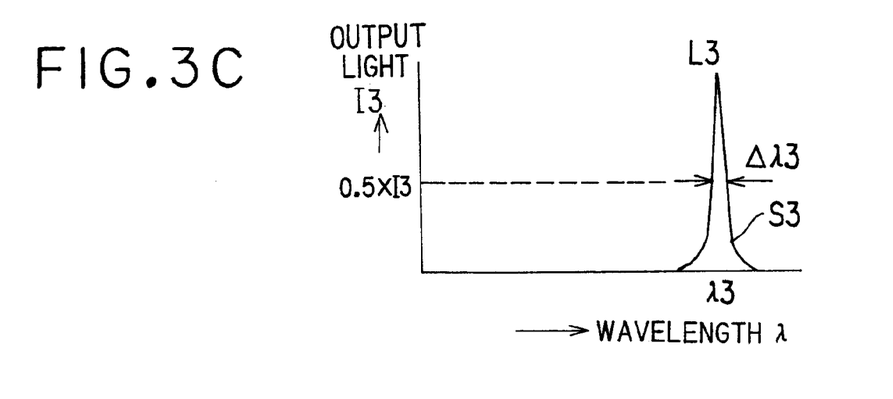

FIG. 3 shows spectra of respective output lights L1, L2, L3, wherein FIG. 3A shows a spectrum of output light L1, FIG. 3B a spectrum of output light L2, and FIG. 3C a spectrum of output light L3.

As shown in FIG. 3, the lights L1 to L3 output from the visible semiconductor light emitting devices 2 to 4 are $\Delta 3$ respectively single wavelengths with peak wavelengths $\lambda 1$, $\lambda 2$, $\lambda 3$. A method for varying the peak light intensities I1 to I3 or the integrated light intensities S1 to S3 is to increase or decrease the level of the continuous drive current or pulse drive current introduced respectively into the visible semiconductor light emitting devices 2 to 4. For example, the pulse drive current may be regulated by modulating the pulse cycle or the pulse width.

In the multi-wavelength visible semiconductor light source according to the invention, all the visible semiconductor light sources 2 to 4 are prepared on an identical substrate. Therefore, it is easy to conduct optical axis matching between the visible semiconductor light sources 2 to 4 and the waveguides 5 to 7. This contributes to a reduction in production cost of the multi-wavelength visible semiconductor light source. Further, all the waveguides 5 to 7, the multiplexer 8, and the common optical output waveguide 9 are integrated on the same substrate that the visible semiconductor light sources 2 to 4 are provided. Therefore, unlike the conventional multi-wavelength visible semiconductor light source which is large in size and large in production cost, the multi-wavelength visible semiconductor light source can be produced in a small size at low production cost.

Next, the production process of the multi-wavelength semiconductor light source according to the first preferred embodiment will be explained. At the outset, visible semiconductor light emitting devices 2 to 4 are formed on a substrate 1 by selective growth or etching. When etching is used for the formation of the visible semiconductor light emitting devices 2 to 4, the step of forming, on the substrate 1, a semiconductor multilayered structure necessary for the light emitting device by metal organic vapor phase epitaxial growth (MOVPE) or molecular beam epitaxy (MBE) and the step of fabricating the structure into a shape necessary for the light emitting device by dry etching or wet etching are repeated to prepare, on the substrate 1, semiconductor light emitting devices which can emit lights with desired wavelengths.

On the other hand, when selective growth is used, a method may be adopted wherein, instead of fabricating the semiconductor multilayered structure into a desired shape by wet etching or dry etching, in a suitable stage in the step of forming, on the substrate 1, a semiconductor multilayer film necessary for the light emitting device by MOVPE or MBE, the formation of the semiconductor multilayer film is once suspended, a dielectric mask of $SiO_2$, SiNx or the like is formed on the semiconductor multilayer film, and selective growth is then again carried out by MOVPE or MBE to form a semiconductor multilayered structure necessary for the light emitting device. In this case, the chemical composition or layer thickness of the semiconductor multilayered structure can be regulated by varying the width of the dielectric mask or the width of the window stripe portion on which the, substrate is exposed. This method is advantageous in that a plurality of semiconductor light emitting devices, which respectively emit lights different from each other or one another in wavelength; can be simultaneously formed.

Next, the multiplexer 8 portion and the common optical output waveguide 9 portion are formed on the substrate 1. When the optical waveguides 5 to 7, the multiplexer 8, and the common optical output waveguide 9 are formed of a semiconductor layer, as with the light emitting device portion, they can be formed by selective growth or etching. When etching is used, the semiconductor multilayered structure, for waveguiding and multiplexing, formed, for example, by MOVPE or MBE is fabricated by dry etching or wet etching into the desired shapes of the optical waveguides 5 to 7, the multiplexer 8, and the common optical output waveguide 9. For the formation of the optical waveguides 5 to 7, the multiplexer 8, and the common optical output waveguide 9, the material used is selected from semiconductor materials, such as materials and compositions which have band gap energy high enough to permit the output lights L1 to L3 from the visible semiconductor light emitting devices 2 to 4 to be propagated therethrough without being absorbed.

Thereafter, if necessary, a single layer of semiconductor or a semiconductor multilayered structure can be additionally provided by MOVPE or MBE. Further, the optical waveguides 5 to 7, the multiplexer 8, the common optical output waveguide 9 and the like may be simultaneously formed by etching. When selective growth is used, devising the production process can realize simultaneous formation of a part or the whole of the visible semiconductor light emitting devices 2 to 4, the optical waveguides 5 to 7, the multiplexer 8, and the common optical output waveguide 9 and, in addition, the semiconductor optical amplifier (SOA) or the electro-absorption optical modulator (EA modulator) or optical switch or the like provided on the optical waveguides 5 to 7, the multiplexer 8, or the common optical output waveguide 9. This can reduce the number of necessary steps and can offer an additional advantage that the visible semiconductor light emitting device portion can be continuously connected to the waveguide portion, contributing to a reduction in coupling loss.

When the optical waveguides 5 to 7, the multiplexer 8, and the common optical output waveguide 9 are formed of a material, other than the semiconductor, such as a dielectric material or a resin material, a modified method is useful wherein separately provided optical waveguides 5 to 7, multiplexer 8, and common optical output waveguide 9, which each are formed of a dielectric material or a resin material, are mounted on a substrate 1 with visible semiconductor light emitting devices 2 to 4 formed thereon, or alternatively, optical waveguides 5 to 7, a multiplexer 8, and common optical output waveguide 9, which each are formed of a dielectric material or a resin material, are formed, for example, by vapor deposition directly on a substrate 1 with visible semiconductor light emitting devices 2 to 4 formed thereon. For example, the formation of a guiding groove on the substrate 1 is effective for facilitating optical coupling between the visible semiconductor light emitting devices 2 to 4 and the optical waveguides 5 to 7, the multiplexer 8, and the common optical output waveguide 9.

The visible semiconductor light emitting devices 2 to 4, the optical waveguides 5 to 7, the multiplexer 8, and the common optical output waveguide 9 may be formed in any order. Further, a part or the whole of the material of the optical waveguides 5 to 7, the multiplexer 8, and the common optical output waveguide 9 may be replaced with a semiconductor. Further, in the above preferred embodiment, three visible semiconductor light emitting devices, which respectively emit lights different from one another in wavelength or wavelength region, have been used. However, any desired number n (n=2 or more) of visible light emitting devices LE1, ..., LEn (n>2), which respectively can emit lights different from each other or one another in wavelength or wavelength region, may be used. Further, two or more, i.e., a plurality of visible light emitting devices may be used for a single wavelength or wavelength region. In particular, when the optical output of the visible semiconductor light emitting device is unsatisfactory in a certain wavelength or wavelength region, the compensation of the optical output at the wavelength or in the wavelength region by using a plurality of light emitting devices, which can emit light with the same wavelength or wavelength region as the certain wavelength or wavelength region, is convenient because the range of colors, which can realize by additive color mixing, can be broadened. Further, the output of light from the visible light emitting devices is not limited to the shapes of the spectra shown in FIG. 3. For example, a plurality of peak wavelengths may exist. Otherwise, a spectrum of a light emitting device LEi and a spectrum of any different light emitting device LEj (wherein i≠j and i and j are each a positive integer) may be partly or entirely overlapped with each other.

Further, when a visible semiconductor laser is used as the visible semiconductor light emitting device, the adoption of distributed feedback laser structure or the distributed bragg reflection laser structure enables close control of wavelength and, in addition, can eliminate the need to provide a reflecting mirror between the semiconductor laser and the optical waveguide 5. Therefore, the integration can be advantageously facilitated.

[Second Preferred Embodiment]

Figure 4:
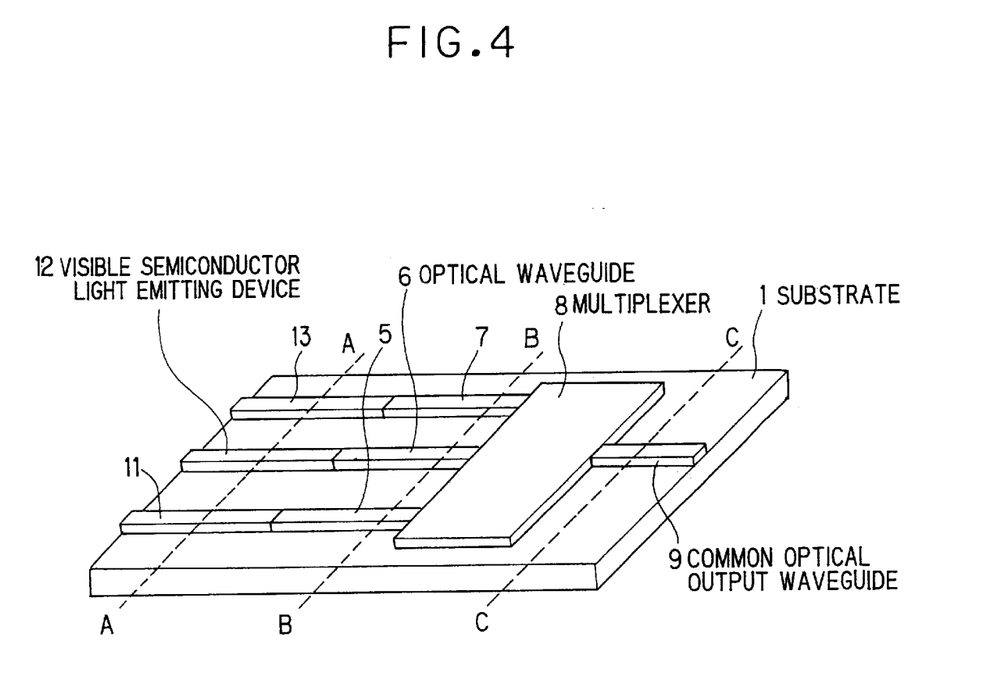
FIG. 4 is a perspective view showing the construction of a second preferred embodiment of the invention.
Figure 5:
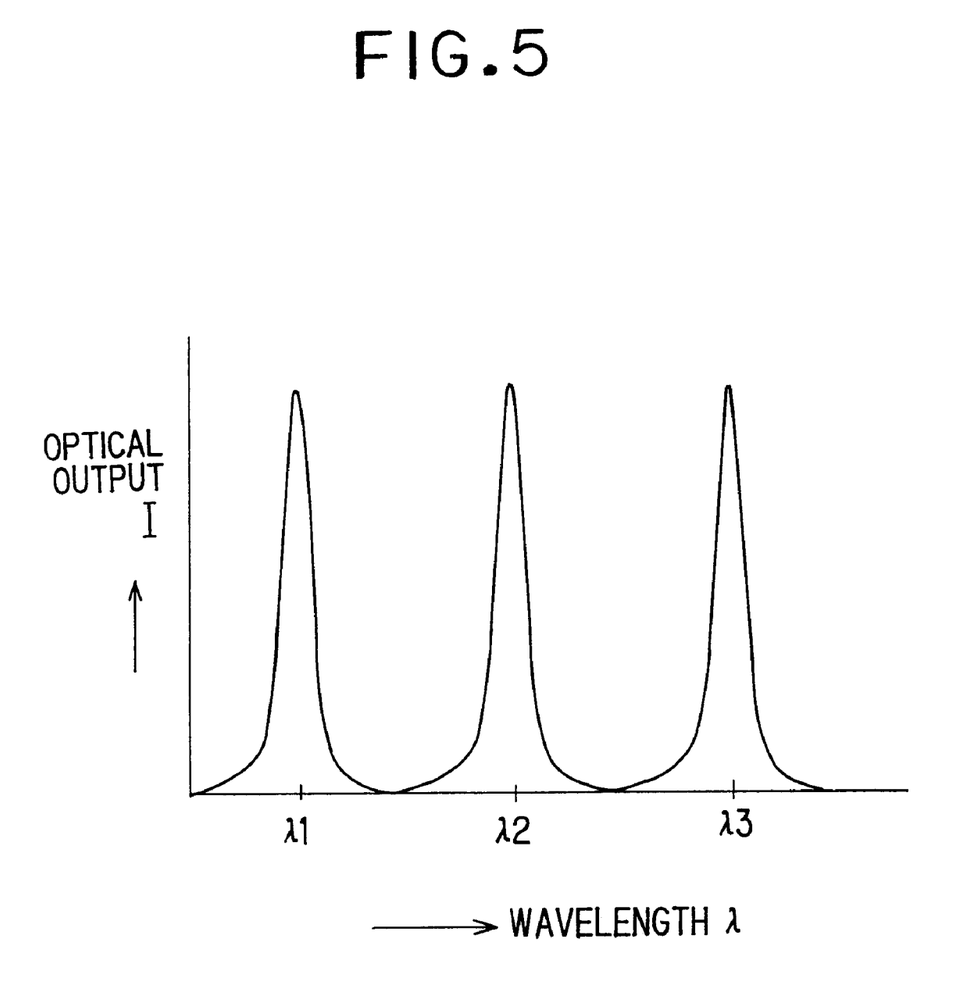
FIG. 5 is a characteristic curve showing a spectrum of light output from a common output waveguide in the preferred embodiment of the invention shown in FIG. 4.
Figure 7:
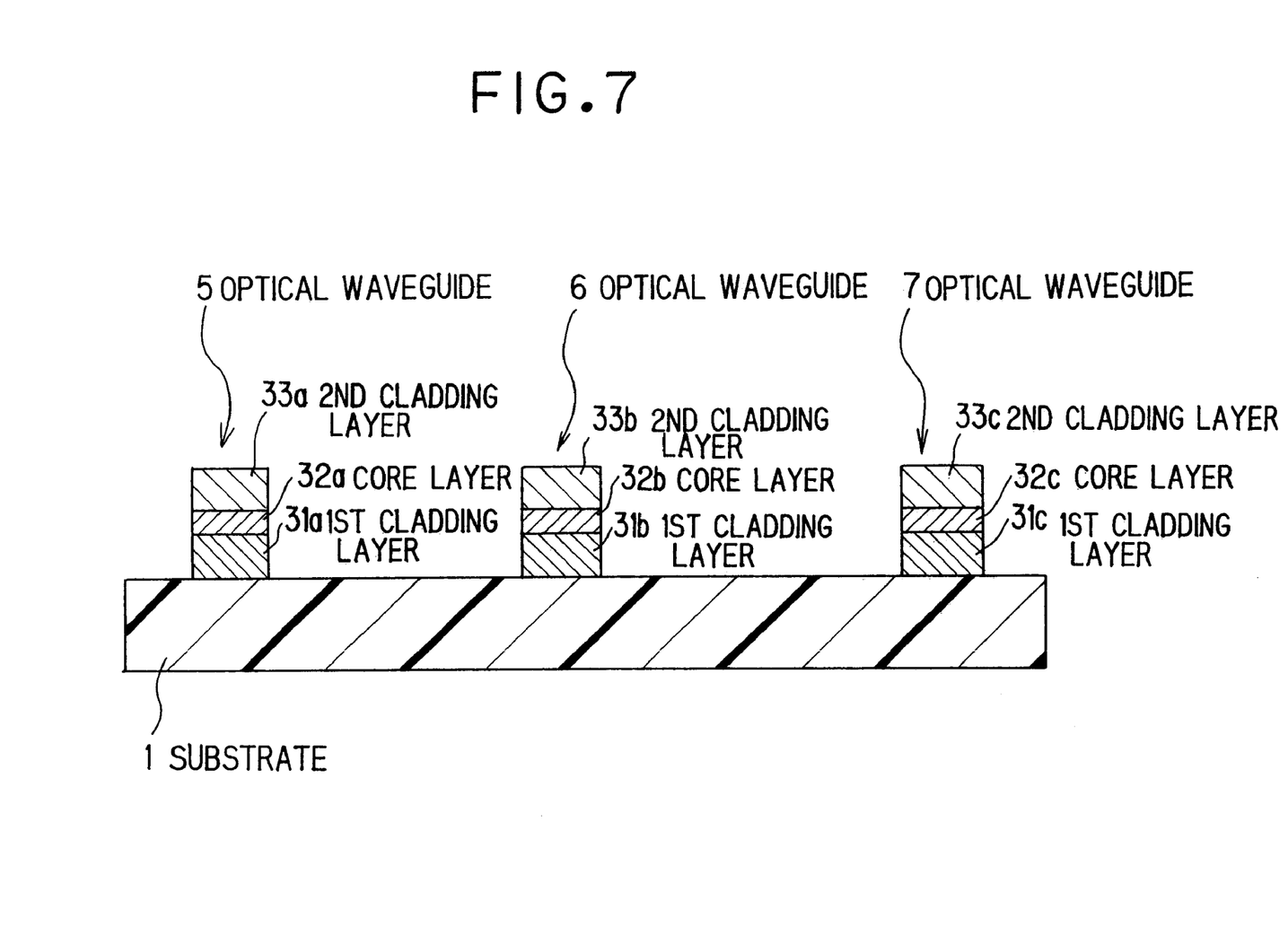
FIG. 7 is a cross-sectional view showing an optical waveguide portion shown in FIG. 4.
Figure 8:
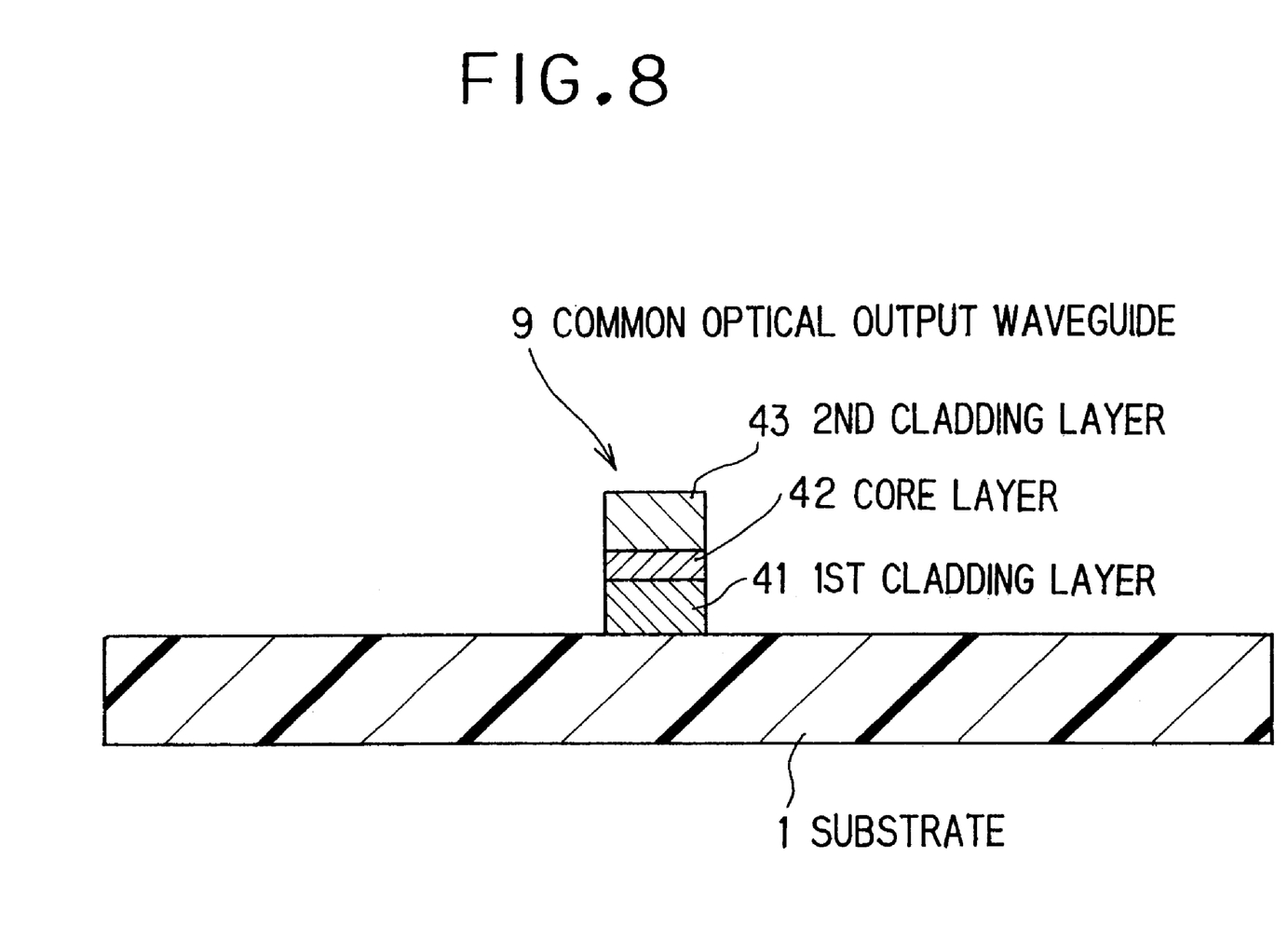
FIG. 8 is a cross-sectional view showing a common optical output waveguide portion shown in FIG. 4.

FIG. 4 shows the second preferred embodiment of the multi-wavelength semiconductor light source according to the invention, and FIG. 5 shows an optical output spectrum of output lights L1 to L3 in the second preferred embodiment of the invention. Further, FIGS. 6, 7, and 8 are respectively cross-sectional views taken on line A—A, line B—B, and line C—C of FIG. 4.

This preferred embodiment is the same as the first preferred embodiment, except that the visible semiconductor light emitting devices 2 to 4 have been changed to visible semiconductor light emitting devices 11 to 13 formed of a group II to VI compound semiconductor. In this preferred embodiment, for example, an n-type InP substrate is used as the substrate 1. A part (or the whole) of the visible semiconductor light emitting devices 11 to 13 provided on the substrate 1 is formed of MgZnCdSe. This structure will be explained in conjunction with FIG. 6.

Figure 6:
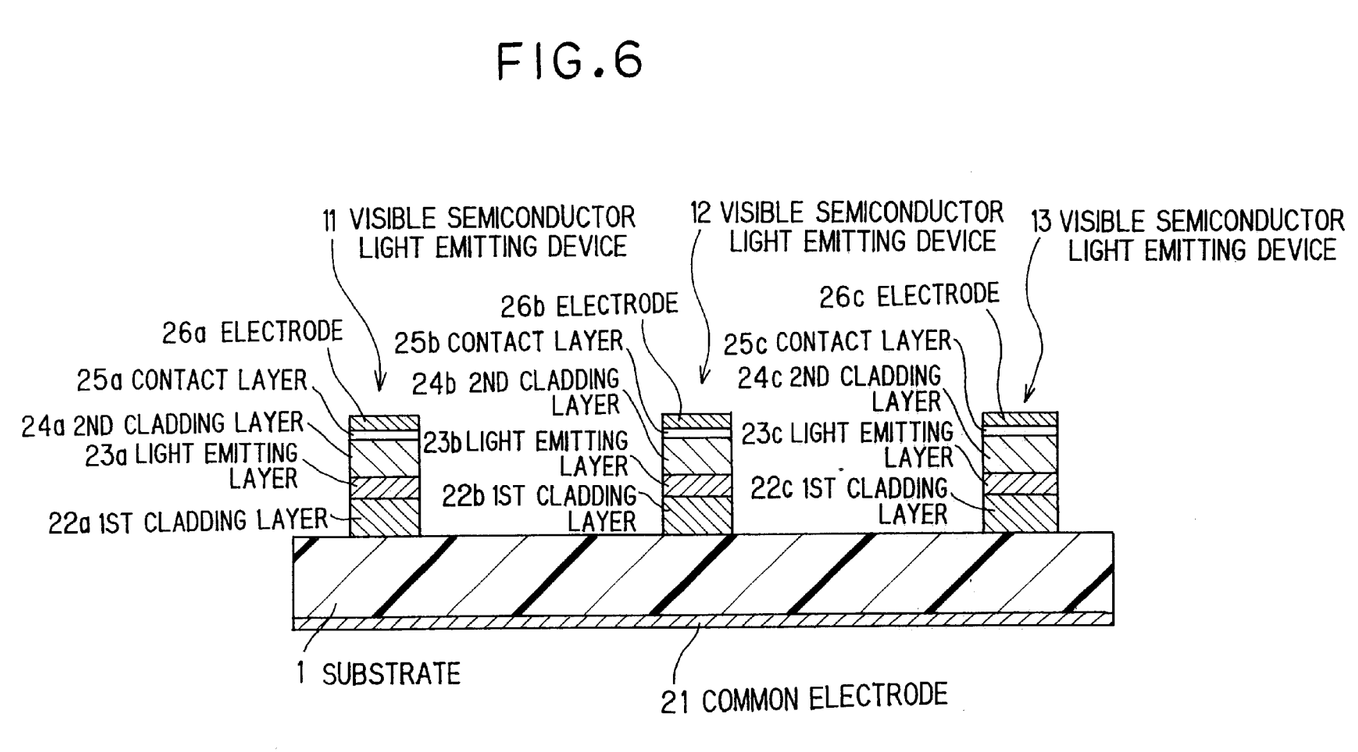
FIG. 6 is a cross-sectional view showing a visible semiconductor light emitting device portion shown in FIG. 4.

As shown in FIG. 6, in the visible semiconductor light emitting device 11 (12, 13), a common electrode 21 is provided on the backside (underside) of the substrate 1. First cladding layers 22a, 22b, 22c having a predetermined width are provided at respective predetermined positions of the surface (upper surface) of the substrate 1. Light emitting layers 23a, 23b, 23C are provided respectively on the surface of the first cladding layers 22a to 22c, and second cladding layers 24a, 24b, 24c are provided respectively on the surface of the light emitting layers 23a to 23c. Further, contact layers 25a, 25b, 25c are provided respectively on the surface of the second cladding layers 24a to 24c, and electrodes 26a, 26b, 26c are provided respectively on the surface of the contact layers 25a, 25b, 25c.

Regarding the visible semiconductor light emitting device 11 (12, 13), the light emitting wavelength can be easily changed over the whole visible region by varying the chemical composition of the light emitting layers 23a to 23c. Further, when the light emitting layers 23a to 23c have a quantum well structure, likewise, the light emitting wavelength can be changed over the whole visible region by varying a part or the whole of the barrier height of the quantum well layer, the chemical composition of the well layer, and the thickness of the well layer. For example, as described in Applied Physics Letters, Vol. 74, pp. 3136–3138, 1998, the emission of lights in the visible light region ranging from a blue wavelength region, i.e., not more than 500 nm, to a red wavelength region, i.e., not less than 600 nm, can be realized by varying the ZnCdSe well width and composition in the ZnCdSe/MgZnCdSe quantum well.

The first cladding layers 22a to 22c and the second cladding layers 24a to 24c each may be formed of, for example, p-type and n-type MgZnCdSe. The contact layers 25a to 25c may be formed of, for example, p-type ZnSeTe. Further, the electrodes 26a to 26c may be a titanium (Ti)/gold (Au) electrode, and the electrode CME 21 may be an indium (In) electrode or the like. Since the above MgZnCdSe mixed crystal can be lattice matched to the surface of the substrate 1 (InP substrate), high-performance light emitting devices can be prepared which are free from crystal defects or the like derived from lattice mismatching.

Further, MgZnCdSe may be used for the formation of the optical waveguides 5 to 7 and the multiplexer 8 as shown in FIG. 7 and the common optical output waveguide 9, the optical waveguides 5 to 7, and the multiplexer 8 as shown in FIG. 8. Further, a part or the whole of a semiconductor optical amplifier (SOA), an electro-absorption optical modulator (EA modulator), an optical switch and the like may be prepared on the common optical output waveguide 9. In this case, a synergistic effect can be attained such that the cost can be reduced by virtue of significant simplification of the production process and, in addition, the device size can be significantly reduced.

In FIG. 7, the optical waveguides 5 comprises a first cladding layer 31a provided on a substrate 1, a core layer 32a provided on the cladding layer 31a, and a second cladding layer 33a provided on the core layer 32a. Likewise, the optical waveguide 6 comprises a first cladding layer 31b provided on the substrate 1, a core layer 32b provided on the cladding layer 31b, and a second cladding layer 33b provided on the core layer 32b, and the optical waveguide 7 comprises a first cladding layer 31c provided on the substrate 1, a core layer 32c provided on the cladding layer 31c, and a second cladding layer 33c provided on the core layer 32c. The first cladding layers 31a to 31c and the second cladding layers 33a to 33c may be formed of, for example, MgZnCdSe, and, for each of the core layers 32a to 32c, MgZnCdSe is optimal that has a composition which has a smaller energy gap than the first cladding layers 31a to 31c and the second cladding layers 33a to 33c and permits lights L1 to L3 output from the visible semiconductor light emitting devices 2 to 4 to be propagated therethrough without being absorbed.

Further, in FIG. 8, the common optical output waveguide 9 comprises a first cladding layer 41, a core layer 42 provided on the surface of the first cladding layer 41, and a second cladding layer 43 provided on the core layer 42. The first cladding layer 41 and the second cladding layer 43 may be formed of, for example, MgZnCdSe. The core layer 42 may be formed of MgZnCdSe having a composition which has a smaller energy gap than the cladding layers 41 and 42 and permits lights L1 to L3 output from the visible semiconductor light emitting devices 2 to 4 to be propagated therethrough without being absorbed.

Instead of the above MgZnCdSe, a group II to VI compound semiconductor comprising a combination of at least one element selected from group II elements (beryllium (Be), magnesium (Mg), zinc (Zn), cadmium (Cd)) with at least one element selected from group VI elements (sulfur (S), selenium (Se), tellurium (Te)) may be used. The electrode material also is not limited to titanium/gold or indium referred to in the above preferred embodiment and may be properly varied. Further, the substrate 1 (InP substrate) in this preferred embodiment may be changed to a group III to V compound semiconductor substrate, such as a GaAs substrate, a GaP substrate, or an InAs substrate, or a group II to VI compound semiconductor substrate, such as a ZnSe substrate, a CdS substrate, or a ZnTe substrate. In this preferred embodiment, the conductivity type of the substrate is n-type. Alternatively, a p-type substrate or a semi-insulating substrate may be used. In this case, the conductivity type or the structure of each layer constituting the light emitting device may be properly varied. Further, the most fundamental layer structure of the light emitting device has been described in this preferred embodiment. The structure, however, may be properly modified to various multilayered structures for performance improvement purposes or structures, in which a current block structure or optical confinement structure has been incorporated.

Any combination of the group II to VI compound semiconductor with the substrate may be used. Further, in the above preferred embodiment, the visible semiconductor light emitting devices 2 to 4 may be formed of a group III nitride semiconductor. This construction will be explained below.

[Third Preferred Embodiment]

Figure 9:
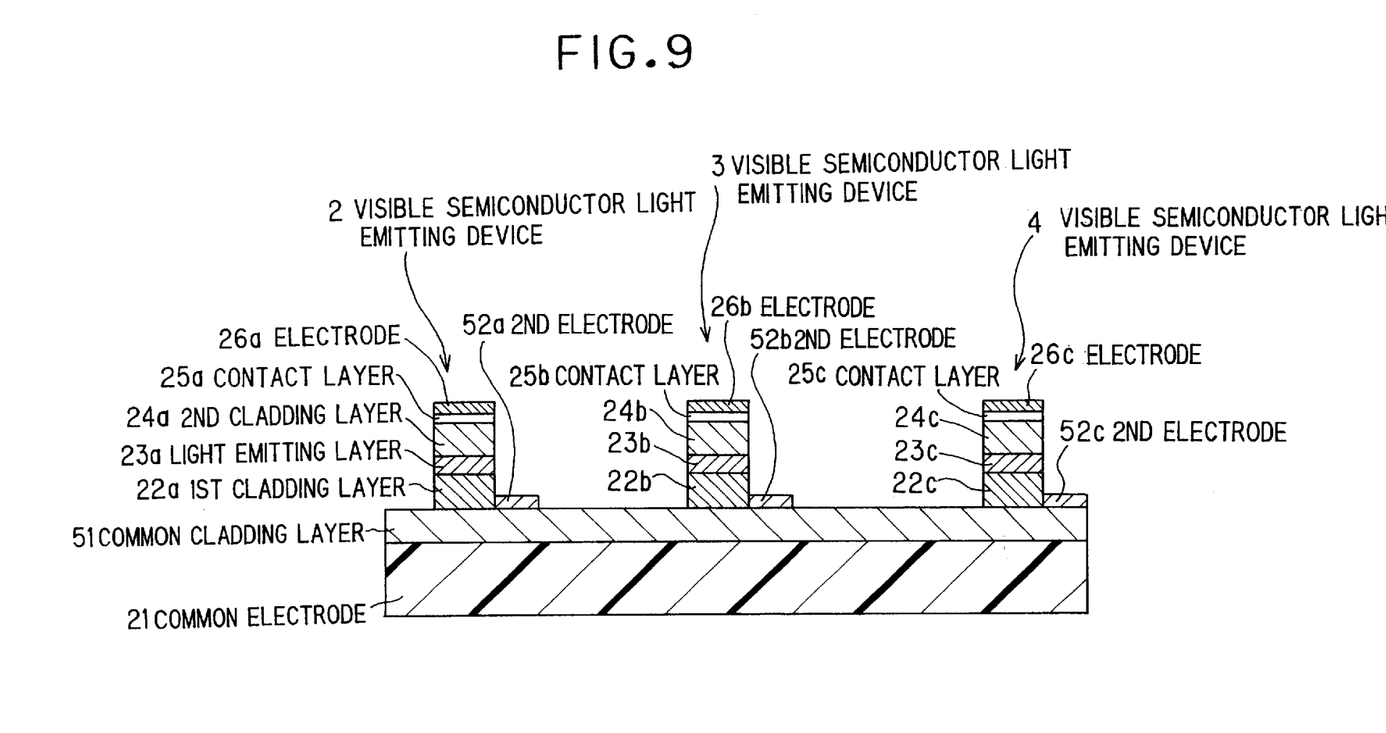
FIG. 9 is a cross-sectional view showing a visible semiconductor light emitting device portion in the third preferred embodiment of the invention.

FIG. 9 shows a multi-wavelength semiconductor light source in the third preferred embodiment of the invention. The appearance of the multi-wavelength semiconductor light source according to this preferred embodiment is as shown in FIG. 4, and the sectional forms of the optical waveguides 5 to 7 and the common optical output waveguide 9 are also the same as those shown in FIGS. 7 and 8. In this preferred embodiment, a sapphire substrate is used as the substrate 1, and a part or the whole of the visible semiconductor light emitting devices 2 to 4 provided on the upper surface of the substrate 1 is formed of AlGaInN.

FIG. 9 corresponds to the sectional position shown in FIG. 6, and, in FIGS. 6 and 9, like parts are identified with the same reference numerals. The structure of five layers of the light emitting layer and layers overlying and underlying the light emitting layer is the same as that shown in FIG. 5, except that, as described above, the visible semiconductor light emitting devices 2 to 4 are formed of a group III nitride semiconductor. Further, a common cladding layer 51 is provided on the substrate 1, and first cladding layers 22a, 22b, 22c are provided on the common cladding layer 51. Second electrodes 52a, 52b, 52c are provided on the common cladding layer 51 so as to be adjacent to the respective cladding layers 22a to 22c.

In FIG. 9, the light emitting wavelength can be easily changed over the whole visible region by varying the chemical composition of the light emitting layers 23a to 23c. Further, when the light emitting layers 23a to 23c have a quantum well structure, the light emitting wavelength can be easily changed over the whole visible region by varying a part or the whole of the barrier height of the quantum well layer, the chemical composition of the quantum well layer, and the thickness of the quantum well layer. A specific example thereof is reported in Japanese Journal of Applied Physics, Vol. 34, L797–L799, 1995. Specifically, the emission of lights in the visible light region ranging from a blue wavelength region, i.e., not more than 500 nm, to a yellow wavelength region, i.e., about 600 nm, can be realized by varying the composition of InGaN and the well width in the InGaNe/AlGaN multiple quantum well.

The first cladding layers 22a to 22c and the second cladding layers 24a to 24c each may be formed of, for example, p-type and n-type AlGaN. The common cladding layer 51 may be formed of, for example, n-type AlGaN. The contact layers 25a to 25c may be formed of, for example, p-type GaN. The first electrodes 26a to 26c may be formed of nickel (Ni)/gold (Au), and the second electrodes 52a to 52c may be formed of titanium (Ti)/aluminum (Al). Further, in a red wavelength region exceeding 600 nm, when a high-efficiency visible semiconductor light emitting device is necessary, for example, an AlGaInP-based light emitting device, which has already been put to practical use for improving the emitting red light intensity, may be used.

Further, in the third preferred embodiment, the optical waveguides 5 to 7 and the multiplexer 8 may be formed of AlGaN. A construction may also be adopted wherein a part or the whole of a semiconductor optical amplifier (SOA), an electro-absorption optical modulator (EA modulator), an optical switch and the like are provided on the common optical output waveguide 9, the optical waveguides 5 to 7, or the multiplexer 8. The above construction can significantly simplify the production process and consequently can reduce the cost and further can significantly reduce the device size.

In the optical waveguides 5 to 7, the first cladding layers 31a to 31c and the second cladding layers 33a to 33c may be formed of, for example, AlGaN, and the core layers 32a to 32c may be formed of GaN. Further, in the common optical output waveguide 9, the first cladding layer 41 and the second cladding layer 43 may be formed of, for example, AlGaN, and the core layer 42 may be formed of GaN.

AlGaN and GaN are transparent to the visible region and thus can form very good waveguides, multiplexer and other passive optical elements in the multi-wavelength visible light source according to the invention.

Further, in the third preferred embodiment, AlGaInN may be changed to a group III nitride comprised of at least one element, selected from group III elements (boron (B), aluminum (Al), gallium (Ga), indium (In)), and nitrogen, or a group III nitride comprised of a combination of at least one element selected from group III elements (boron (B), aluminum (Al), gallium (Ga), indium (In)), at least one element selected from group V elements (phosphorus (P), arsenic (As), antimony (Sb)), with nitrogen, that is, the so-called "III–V–N." This is particularly suitable for improving light emitting efficiency at a wavelength of not less than about 500 nm, for increasing the sharpness of peak wavelength, and for utilization to laser. Further, a construction may be adopted wherein a light emitting device of AlGaInN is used as a light source and fluorescence from an AlGaInP-based material or the above group III nitride of III–V–N or the above group II–VI compound material is used.

Further, in the third preferred embodiment, an SiC substrate, a GaN substrate, an Si substrate or the like may be used instead of the sapphire substrate. Alternatively, a group III–V compound semiconductor substrate, such as an InP substrate, a GaAs substrate, a GaP substrate, or an InAs substrate, may be used. Furthermore, other compound materials, on which the crystal of the group III nitride semiconductor can be grown, may be used as the substrate. Any combination of the group III nitride semiconductor with the substrate may be used. Further, the electrode material is not always limited to nickel (Ni)/gold (Au) and titanium (Ti)/aluminum (Al) referred to in the above preferred embodiment and may be properly varied.

Further, in this preferred embodiment, the construction as shown in FIG. 9 has been adopted because sapphire, which is an insulating material, is used as the substrate. Alternatively, the substrate may be formed of GaN, SiC, silicon (Si), a group III to V compound semiconductor, or other compound material having p-type or n-type conductivity. In this case, a construction corresponding to that of the second preferred embodiment shown in FIG. 6 may be adopted while properly selecting conductivity type of the layers and structure of the light emitting device. Further, in this preferred embodiment, the most fundamental layer structure of the light emitting device has been described. The structure, however, may be properly modified to various multilayered structures for performance improvement purposes or structures, in which a current block structure or optical confinement structure has been incorporated.

Further, in the above preferred embodiment, regarding the visible semiconductor light emitting devices 2 to 4, a combination of an AlGaInP mixed crystal with any one of or both a group II to VI compound semiconductor light emitting device and a group III nitride light emitting device may be used to form a visible semiconductor light emitting device array on an identical substrate. Further, a method may be adopted wherein only passive optical components, such as waveguides and multiplexer, are formed of AlGaInN while the visible semiconductor light source is formed of a group II to VI compound semiconductor, or vice versa.

As described above, according to the multi-wavelength semiconductor light source of the invention, all of a plurality of semiconductor light emitting devices, a plurality of optical waveguides coupled thereto, and a multiplexer coupled to the optical waveguides are integrally provided on an identical substrate to constitute a single device. This can eliminate the necessity of preparing separate components, components assembly step, and steps for matching or the like and thus can realize a reduction in size and a reduction in cost. Further, when optical elements, such as waveguides, multiplexers, semiconductor amplifiers, modulators, and optical switches, are also integrated on an identical substrate, the necessity of conducting optical axis matching between individual optical components can be eliminated.

In the production process of a multi-wavelength semiconductor light source according to the invention, after the formation of a plurality of semiconductor light emitting devices on a substrate, a plurality of optical waveguides coupled to the semiconductor light emitting devices and a multiplexer coupled to the optical waveguides are formed onto the substrate. Accordingly, the plurality of semiconductor light emitting devices and the plurality of optical waveguides can be simultaneously provided on a single substrate. This can eliminate the necessity of preparing separate components, components assembly step, and steps for matching or the like and thus can realize a reduction in size of the multi-wavelength semiconductor light source and, at the same time, can realize a reduction in cost by virtue of the simplification of the production process.

Further, in the another production process of a multi-wavelength semiconductor light source according to the invention, after the formation of a plurality of semiconductor light emitting devices on a substrate, a plurality of optical waveguides coupled to the semiconductor light emitting devices and a multiplexer coupled to the optical waveguides are mounted onto the substrate. Accordingly, the plurality of semiconductor light emitting devices and the plurality of optical waveguides can be simultaneously provided on a single substrate. This can eliminate the necessity of preparing separate components, components assembly step, and steps and works for matching or the like and thus can realize a reduction in size and a reduction in cost.

The invention has been described in detail with particular reference to preferred embodiments, but it will be understood that variations and modifications can be effected within the scope of the invention as set forth in the appended claims.

What is claimed is:

1. A multi-wavelength semiconductor light source comprising:
    a substrate;
    a plurality of semiconductor light emitting devices provided on the substrate, for emitting respective lights different from each other or one another in wavelength;
    a plurality of optical waveguides provided on the substrate so that the optical waveguides in their one end are coupled respectively to the plurality of the semiconductor light emitting devices; and
    a multiplexer provided on the substrate so as to be coupled respectively to the other ends of the plurality of optical waveguides, for multiplexing lights output from the plurality of optical waveguides and outputting the multiplexed light.

2. The multi-wavelength semiconductor light source according to claim 1, wherein the multiplexer is coupled to a common optical output waveguide which is provided on the substrate so as to output the multiplexed light from the multiplexer.

3. The multi-wavelength semiconductor light source according to claim 1, wherein the multiplexer is formed of a semiconductor, a dielectric material, or a resin material.

4. The multi-wavelength semiconductor light source according to claim 1, wherein the multiplexer outputs light with any desired wavelength in a visible light region or white light.

5. The multi-wavelength semiconductor light source according to claim 1, wherein the plurality of semiconductor light emitting devices are a distributed feedback laser or a distributed bragg reflection laser.

6. The multi-wavelength semiconductor light source according to claim 1, wherein the plurality of semiconductor light emitting devices are formed of a group II–VI semiconductor or a group III nitride semiconductor.

7. A process for producing a multi-wavelength semiconductor light source, comprising the steps of:
    forming a plurality of semiconductor light emitting devices, which each comprise a light emitting layer and a pair of cladding layers sandwiching the light emitting layer therebetween and emit respective lights different from each other or one another in wavelength, on a substrate by a method including etching or selective formation; and
    forming, on the substrate by a method including etching or selective formation, a plurality of optical waveguides, which each comprise a core layer and a pair of cladding layers sandwiching the core layer therebetween, the plurality of the optical waveguides in their one end being coupled respectively to the plurality of semiconductor light emitting devices, and a multiplexer coupled to the other ends of the plurality of optical waveguides.

8. The process according to claim 7, wherein the formation of the plurality of semiconductor light emitting devices and the formation of the plurality of optical waveguides and the multiplexer are carried out in reverse order.

9. The process according to claim 7 or 8, wherein the multiplexer is formed of a semiconductor, a dielectric material, or a resin material.

10. The process according to claim 7 or 8, wherein the plurality of semiconductor light emitting devices each are prepared so as to form a distributed feedback laser or a distributed bragg reflection laser.

11. The process according to claim 7 or 8, wherein the plurality of semiconductor light emitting devices are prepared so as to form a group II–VI semiconductor or a group III nitride semiconductor.

12. A process for producing a multi-wavelength semiconductor light source, comprising the steps of:
    forming a plurality of semiconductor light emitting devices, which each comprise a light emitting layer and a pair of cladding layers sandwiching the light emitting layer therebetween and emit respective lights different from each other or one another in wavelength, on a substrate by a method including etching or selective formation; and
    previously preparing a plurality of optical waveguides, which each comprise a core layer and a pair of cladding layers sandwiching the core layer therebetween, the plurality of the optical waveguides in their one end being to be coupled respectively to the plurality of semiconductor light emitting devices, and a multiplexer to be coupled to the other ends of the plurality of optical waveguides, and, after the formation of the plurality of semiconductor light emitting devices, mounting the plurality of optical waveguides and the multiplexer onto the substrate.

13. The process according to claim 12, wherein, after mounting of the plurality of optical waveguides and the multiplexer onto the substrate, the plurality of semiconductor light emitting devices are formed.

14. The process according to claim 7 or 12, wherein the plurality of semiconductor light emitting devices each are prepared so as to form a distributed feedback laser or a distributed bragg reflection laser.

15. The process according to claim 12 or 13, wherein the plurality of semiconductor light emitting devices are prepared so as to form a group II–VI semiconductor or a group III nitride semiconductor.

* * * * *